United States Patent [19]

Foster et al.

[11] 4,176,356
[45] Nov. 27, 1979

[54] DIRECTIONAL ANTENNA SYSTEM INCLUDING PATTERN CONTROL

[75] Inventors: L. Curtis Foster, Barrington Hills; Carl E. Lindholm, North Barrington, both of Ill.

[73] Assignee: Motorola, Inc., Schaumburg, Ill.

[21] Appl. No.: 810,234

[22] Filed: Jun. 27, 1977

[51] Int. Cl.$^2$ ............................................. H04B 7/00
[52] U.S. Cl. ........................ 343/100 CS; 343/117 A; 325/369
[58] Field of Search .......... 343/100 CS, 854, 100 SA, 343/117 A; 325/369, 381, 304, 305

[56] References Cited

U.S. PATENT DOCUMENTS

| 2,786,133 | 3/1957 | Dyke | 325/369 |
|---|---|---|---|
| 3,453,623 | 7/1969 | Blackband et al. | 343/100 CS |
| 3,568,197 | 3/1971 | Cubley | 325/369 |

Primary Examiner—Theodore M. Blum
Attorney, Agent, or Firm—James W. Gillman; Phillip H. Melamed

[57] ABSTRACT

A directional antenna system is disclosed which selectively couples two radiating antenna elements to a transceiver through a selective phase, magnitude and matching network which is controlled by the output of a logic circuit. The network provides for equal magnitude current coupling between the transceiver and the two antennas while simultaneously selectively producing either positive or negative approximately 90° phase shifts between the two antennas to produce either of two discrete directive cardioid radiation patterns directed in substantially opposite directions. The logic circuit, in conjunction with a manual step switch, provides for a manually selecting either of the two cardioid radiation patterns, as well as producing a figure eight or an omnidirectional radiation pattern. For generating a transceiver omnidirectional pattern, one antenna is used and the other is connected to a standard broadcast band receiver. Matching networks are simultaneously selectively connected between the two antennas and the transceiver such that maximum power transfer and impedance matching is maintained for different radiation patterns. An automatic scanning switch is coupled to the logic circuit and provides for automatically selecting one of the cardioid radiation patterns as an optimum pattern in which the signal from the remote site is most strongly received by the transceiver. Indicating lights are provided to indicate which one of the radiation patterns is generated for the transceiver.

49 Claims, 11 Drawing Figures

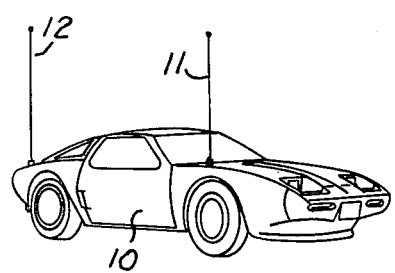
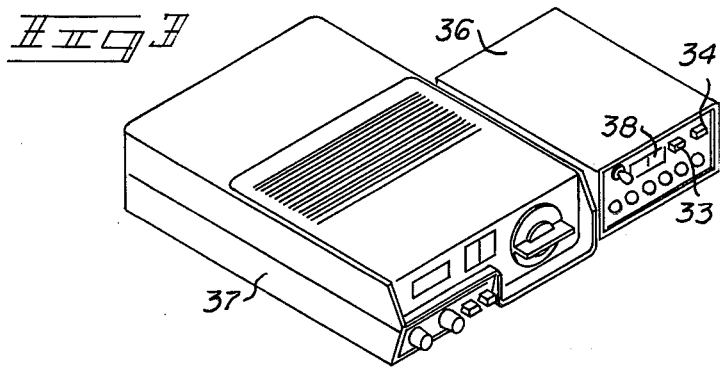
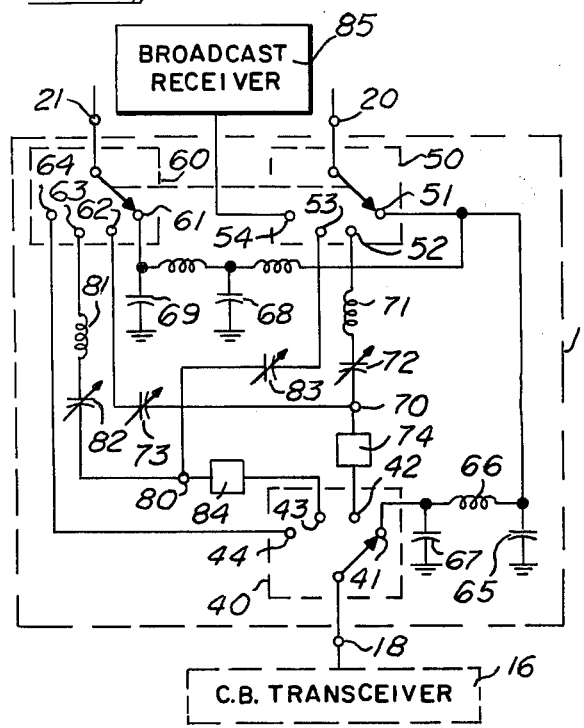

DIRECTIONAL ANTENNA SYSTEM INCLUDING PATTERN CONTROL

BACKGROUND OF THE INVENTION

The present invention generally relates to the field of communication apparatus which use directive antennas radiators. In particular, the present invention relates to the use of such apparatus with a mobile transceiver radio.

In the past radios and transceivers have generally used omnidirectional radiation patterns. Thus the standard transceiver antenna is an omnidirectional quarter wavelength radiator. The use of this type of radiation pattern makes it impossible for a transceiver to determine what direction a signal is being received from. Often times this information is extremely important to the transceiver operator. In addition, the use of an omnidirectional radiation pattern fails to provide any way for the operator of a transceiver to avoid interferring signals. Thus a strong signal coming from off to the side of the transceiver or from the rear of the transceiver can totally prevent the transceiver from communicating with a remote location directly ahead of the transceiver. Such a result is obviously undesirable.

Some base station (fixed location) antennas have generated "directive radiation patterns" in response to a manual radiation pattern selection process. Generally, this manual process consists of mechanically rotating an antenna which generates a single directive beam. Such techniques are too costly and too complicated for implementation on a mobile installations, such as on an automobile. The term "directive radiation pattern" is commonly understood to refer to those patterns in which the radiated radio frequency (R.F.) energy of a transmitter, for example, is substantially concentrated in one horizontal direction while being substantially reduced and having a null in another horizontal direction.

While it is known that altering the phase between radiating elements can result in electrically rotating a directional beam, such systems have not been successfully applied to mobile installations, since a uniform effective ground plane is not normally available for the radiating antenna elements. In addition, prior art antenna phasing systems do not provide for maintaining equality between the radiation currents present in the phased radiating antennas when the phase between radiating elements is changed. Thus beam uniformity is destroyed since it was impossible to produce two substantially similar radiation patterns that were directed in substantially opposite directions.

In the past, dual CB (Citizen Band) antennas have been mounted on motor vehicles. However, these antennas have been mounted in a direction perpendicular to the direction of movement of the motor vehicle and these antennas have only been simultaneously utilized with substantially zero phase existing between the two antennas. These dual "cophase" antennas are used only to produce a single radiation pattern which is generally egg shaped and which is only marginally stronger in both the front and rear directions of the automobile movement while providing substantially no isolation for the transceiver from signals off to the side of the automobile. Thus these dual antennas only provide a single radiation pattern which cannot be used to indicate the location of a remote transmission site with respect to the transceiver, and cannot be used to avoid interferring signals which are not directly in line between the transceiver and the remote site. If the automobile had a standard broadcast band receiver, in addition to a CB transceiver with dual antennas, an additional separate antenna must be provided for the broadcast receiver.

SUMMARY OF THE INVENTION

An object of the present invention is to provide an improved directional antenna system which overcomes all of the aforementioned defiencies.

A more particular object of the present invention is to provide an improved directional antenna system in which a plurality of discrete directive radiation patterns are produced which enable the operator of a communication device to avoid interferring signals which are not directly in line between the communication device and a desired remote site.

Another object of the present invention is to provide an improved directional antenna system in which a plurality of discrete directive radiation patterns are selectively generated for a communication means whereby information is provided as to the location of a remote transmitter site with respect to the communication means.

A further object of the present invention to provide an improved directional antenna system in which one of a plurality of radiation patterns is selected, preferrably automatically, as an optimum radiation pattern.

A still further object of the present invention is to provide an improved directional antenna system in which a plurality of directive radiation patterns are produced by selectively creating various phase differences between at least two simultaneously utilized antennas elements while simultaneously insuring that similar radiation patterns are produced by providing for substantially equal magnitude current coupling between the antenna elements producing the radiation pattern and a transceiver means.

An additional object of the present invention is to provide an improved directional antenna system in which a minimum number of antenna elements are utilized for a transceiver and a separate receiver operating at different frequencies.

In an embodiment of the present invention an improved directional antenna system is provided, comprising: communication means operative at a carrier frequency for establishing communications with a remote site; means coupled to said communication means for selectively generating a plurality of discrete directive radiation patterns for said communication means; and means coupled to said radiation pattern generating means for automatically selecting one of said radiation patterns as an optimum radiation pattern, said automatically selected optimum radiation pattern corresponding to the one pattern of said plurality of patterns in which a desired signal is most strongly received by said communication means, whereby the automatic selection of an optimum radiation pattern enables the communication means to avoid interferring signals which are not directly in line between the communication means and the remote site.

The present invention also provides an improved directional antenna system comprising: communication means, including a plurality of antenna elements for providing radiation patterns, for establishing communications with a remote site; and means coupled to said antenna elements for selectively generating a plurality of discrete directive radiation patterns for said communication means by simultaneously utilizing at least two of said antenna elements, the plurality of radiation patterns including at least two radiation patterns directed in substantially opposite directions, said radiation pattern generating means including a network for selectively creating various phase differences between said simultaneously used antenna elements in said plurality of antenna elements while simultaneously providing for substantially equal magnitude current coupling between said utilized antenna elements and said communication means.

In the preferred embodiment of the present invention, two radiating antenna elements are spaced a quarter of a wavelength apart and are mounted on a motor vehicle in a line parallel to the straight line of movement of the motor vehicle. These two antenna elements are selectively utilized to generate the plurality of discrete directive radiation patterns for a transceiver which is carried by the motor vehicle, the plurality of radiation patterns including at least two substantially similar radiation patterns having nulls directed in substantially opposite directions. These two oppositely directed patterns are preferrably cardioid in shape.

The preferred embodiment of the present invention also includes an indicating means which is located adjacent to the transceiver and indicates which one of the plurality of radiation patterns is selectively generated for the transceiver means by the radiation pattern generating means. In addition, automatic selecting means is provided for selecting the optimum radiation pattern of said two oppositely directed radiation patterns during which a desired signal from the remote site is most strongly received by the communication means. In this manner, the indicator means will provide information as to the location of the remote site with respect to the transceiver means. Also, manual selection of any one of the plurality of discrete directive radiation patterns is provided in the present invention. This enables the operator of the communication means to avoid interfering signals which are not directly in line between the communication means and the remote site by selecting a radiation pattern which more effectively screens out these unwanted signals.

In addition, an AGC magnitude indication is provided, which, together with said pattern indicating means, permits manual determination of the location of the remote site. Also only two antenna elements are used to create both omnidirectional and directive radiation patterns for a transceiver, while also selectively providing radiation patterns for a separate receiver.

BRIEF DESCRIPTION OF THE DRAWINGS

For a more complete understanding of the invention reference should be made to the drawings, in which:

FIG. 1 is perspective drawing of a motor vehicle having two antennas mounted on it in accordance with the present invention;

FIG. 2 is a combination block and schematic diagram of a communication apparatus intended to utilize the antenna elements illustrated in FIG. 1;

FIG. 3 is a perspective drawing of a CB transceiver and an accessory attachment which houses the key elements of the communication apparatus shown in FIG. 2;

FIGS. 4A through 4G are graphical diagrams illustrating various horizontal radiation patterns capable of being produced by the communication apparatus shown in FIG. 2 when utilized along with the antenna elements illustrated in FIG. 1; and FIG. 5 is a schematic and block diagram of an embodiment of a portion of the communication apparatus illustrated in FIG. 2.

DESCRIPTION OF THE PREFERRED EMBODIMENT

FIG. 1 illustrates a motor vehicle 10 on which are mounted first and second radiating citizen band (CB) antenna elements 11 and 12, respectively, which are positioned in accordance with the teachings of the present invention. The distance between the antenna elements 11 and 12 is approximately one quarter of a wavelength at a frequency in the middle of the CB frequency range. These two antenna elements are positioned in a line substantially parallel to the straight line of movement of the motor vehicle. Perferably, the antenna elements 11 and 12 would both be mounted on either the right or left hand side of the motor vehicle, one on the cowl portion of the automobile and the other generally on the rear fender.

In general, the present invention contemplates simultaneously utilizing both of the antenna elements 11 and 12 while selectively providing predetermined positive and negative phase differences between these antennas elements to selectively produce either of two oppositely directed cardioid radiation patterns, as well as other radiation patterns. One of the cardioid radiation patterns will be directed in the forward motion direction of the motor vehicle 10, and therefore have a null in the opposite direction, while the other radiation pattern will be directed in the rearward motion direction of the vehicle 10. Thus by selectively generating these cardioid radiation patterns, a CB transceiver operative at a carrier frequency can utilize the antenna elements 11 and 12 and effectively communicate with a remote site directly in front of the motor vehicle 10 without receiving interferring signals of the same frequency from a transmitter operating directly to the rear of the motor vehicle 10 and vice versa. Thus the present invention enables a CB transceiver to avoid interferring signals which are not directly in line between the transceiver and the remote site which the operator of the transceiver wishes to communicate with. Directive beams other than cardioid beams can also be generated from the radiating elements 11 and 12, and the narrower these beams, the more resolution and the more effective the antenna system would be in avoiding the reception of unwanted signals. Also, when directive CB radiation patterns are not needed, antenna 12 can be used to generate an omnidirection CB radiation pattern while antenna 11 can generate a separate omnidirectional radiation pattern for an AM broadcast band receiver.

FIG. 2 illustrates a communication apparatus 15 which utilizes the radiating antenna elements 11 and 12 illustrated in FIG. 1. The apparatus 15, together with the antenna elements 11 and 12 comprise the directive antenna system of the present invention. In FIG. 2, as well as all other Figures, identical reference numbers will be used to identify corresponding elements.

The communications apparatus 15 basically comprises a CB transceiver 16 which includes a transmitter portion and a receiver portion both operable at selected carrier frequencies. The receiver portion is contemplated as developing an automatic gain control (AGC) signal which has a magnitude inversely related to the strength of a CB signal received by the receiver portion.

The receiver and transmitter portions of the transceiver 16 are selectively connected through a transmission line coaxial cable 17 to an external terminal 18 of a selective phase, magnitude and matching network 19. The network 19 also has external terminals 20 and 21. The terminal 20 is connected to a terminal 22 through a transmission line cable 23, and the terminal 22 is coupled to ground through a matching capacitor 24 and coupled to the radiating antenna element 11 through a loading coil 25. Similarly, the radiating element 12 is coupled by a loading coil 26 to a terminal 27 that is coupled to ground through a matching capacitor 28 and coupled to the terminal 21 through a transmission line 29. Essentially, the network 19 couples the CB transceiver 16 to the radiating antenna elements 11 and 12 and selectively provides (1) the proper phase difference between the radiating antenna elements, (2) control of the magnitude of the radiation currents in the antenna elements with respect to the CB transceiver current, and (3) impedance matching between the transceiver 16 and the radiating antenna elements 11 and 12.

The network 19 is controlled by a logic circuit 30 which is coupled thereto and supplies a plurality of control signals to the network 19. The logic circuit 30 is also coupled to the CB transceiver 16 by an electrical connection 31 which couples the AGC voltage of the transceiver 16 to the logic circuit 30. An oscillator 32 produces a relatively low frequency signal, e.g. 3 Hz, which is coupled to the logic circuit 30 and functions as a low frequency timing signal for the circuit 30. A scan activation switch 33 is also coupled to the logic circuit 30 and so is a step switch 34. An indicator means 35 having a plurality of indicating lights is also coupled to the logic circuit 30.

In essence, the logic circuit 30 supplies a plurality of control signals to the network 19 which cause the network to generate any one of a plurality of discrete directive radiation patterns for the CB transceiver 16 by simultaneously utilizing the antenna elements 11 and 12 and selectively creating different phase relationships between the antennas elements. The circuit 30 also selectively causes the network 19 to generate omnidirectional radiation patterns. The exact operation of the logic circuit 30 and its relationship to the network 19 will be discussed in greater detail subsequently.

FIG. 3 represents a perffered mechanical embodiment of the present invention in which the elements 30 through 35 are contained in a box shape container 36 which is attached to a housing 37 of the CB transceiver 16. The box type container 36 contains a manually actuatable scan switch designated as 33 and a manually actuatable step switch designated as 34, in addition to a plurality of indicating lights. The container 36 also has a meter 38 which indicates the strength of the AGC signal of the receiver portion of the transceiver 16. The electrical connection 31 between the transceiver 16 and the logic circuit 30 is contemplated as being provided by a pin and socket arrangement forming an electrical connection through the housing 37 and the box type container 36. In addition, the box container 36 is also contemplated as housing a substantial portion of the selective phase, magnitude and matching network 19.

FIGS. 4A through 4G illustrate the horizontal radiation patterns which can be implemented by selectively altering the phase relationship between the simultaneously utilized radiating elements 11 and 12, as well as selectively utilizing either of the radiating elements 11 or 12.

FIG. 4A merely illustrates a diagramatical horizontal plane view of the motor vehicle 10 and the radiating elements 11 and 12 which can generate the radiation patterns 4B through 4G. In FIG. 4A, the elements 11 and 12 are illustrated as being located in the center, rather than on the right or left side, of the vehicle 10. The patterns in FIGS. 4B through 4G are those created by centrally locating the antenna elements as shown in FIG. 4A. If the elements are located on the right or left side of the vehicle, then the resultant patterns would be skewed in the direction of the larger metallic surface of the vehicle.

FIG. 4B illustrates the horizontal radiation pattern which results when only the radiating element 12 is excited. The radiation pattern is omnidirectional, but is somewhat skewed or distorted in the direction of the larger metallic surface of the motor vehicle 10. FIG. 4C illustrates the resultant horizontal radiation pattern if only the radiating element 11 is excited. Neither of these patterns has a substantial null in any horizontal direction.

FIG. 4D illustrates a cardioid radiation pattern which is produced when the radiating elements 11 and 12 are excited such that the radiation current in the element 11 is equal to that in the element 12 and has positive approximately 90° phase shift with respect to the current in the element 12. This cardioid radiation pattern generally extends in the rearward direction of motion of the motor vehicle 10 and has a substantial null in the forward direction.

FIG. 4E illustrates a substantially similarly shaped cardioid radiation pattern which extends in the forward direction of motion of the vehicle 10 and has a substantial null in the rearward direction. This forward directional cardioid pattern is produced by having equal radiation currents in the elements 11 and 12, but having the radiation current of the element 11 having a negative approximately 90° phase relationship with respect to the radiation current of the element 12.

For generating the cardioid radiation patterns 4D and 4E for the present invention, it has been found that a substantially 70° phase difference between the elements 11 and 12 will produce a much more desirably shaped cardioid radiation pattern, in that more of the radiation pattern will be directed in the primary front or rear directions and less of the pattern directed in the null rear or front directions.

FIG. 4F illustrates the radiation pattern produced when a 180° phase shift exists between equal radiation currents in the antenna 11 and 12.

FIG. 4G illustrates the radiation pattern produced when a 0° phase relationship exists between equal radiation currents in the elements 11 and 12. This pattern corresponds to the pattern produced by the dual "co-phase" antennas previously discussed, except that here the maximum gain of the radiation pattern is perpendicular to direction of movement of the automobile 10. No substantial horizontal null direction exists for this pattern.

FIG. 5 illustrates a preferred construction of the selective phase, magnitude and matching network 19 (now shown dashed) with terminals corresponding to the terminals 18, 20 and 21 being identically number. The terminal 18 is directly coupled to a rotor (wiper arm) terminal of a four position rotary switch 40 (shown dashed). In the first, second, third and fourth positions of the rotary switch 40, the terminal 18 is connected to terminals 41, 42, 43 and 44, respectively. The network 19 also comprises a similar four position rotary switch 50 which has a rotor terminal directly connected to the terminal 20 and first, second, third and fourth position terminals 51, 52, 53 and 54, respectively. Also, the network 19 includes another four position rotary switch 60 having a rotor terminal directly connected to the terminal 21 and first, second, third and fourth position terminals 61 through 64, respectively. The operation of the switches 40, 50, and 60 is contemplated as being sychronized such that all of the switches will either be in their first, second, third, or fourth positions at the same time. The control signals received from the logic circuit 30 determine what position these switches will be in. While rotary position switches are illustrated for the switches 40, 50 and 60, it is contemplated that electronic switching using PIN diodes which respond to electrical control voltage biasing can be used instead of manual or motor driven rotary switches.

The terminal 51 is coupled to ground through a capacitor 65 and is coupled to the terminal 41 through an inductor 66. The terminal 41 is directly connected to ground through a capacitor 67. The terminal 51 is also coupled to the terminal 61 through a 180° phase shift network comprising two series connected "L" shaped inductor and capacitor networks 68 and 69. The terminal 52 is coupled to a terminal 70 through an inductor 71 connected in series with a variable capacitor 72. The terminal 70 is coupled to the terminal 62 through a variable capacitor 73 and is coupled to the terminal 42 through an impedance matching network 74 shown in block form. Similarly, the terminal 63 is coupled to a terminal 80 through an inductor 81 connected in series with a variable capacitor 82, and the terminal 80 is coupled to the terminal 53 through a variable capacitor 83 and to the terminal 43 through a matching network 84. The terminal 44 is directly connected to the terminal 64 and the terminal 54 is isolated from all other terminals and is connected to an AM broadcast band radio 85. The components 40 through 84 comprise all of the essential elements of the network 19 illustrated in FIG. 5.

The network 19 described in the preceding paragraph enables the communication apparatus 15 illustrated in FIG. 2 to generate the radiation patterns illustrated in FIGS. 4B, 4D, 4E and 4F for the transceiver 16.

With the switches 40, 50 and 60 in their first positions, a 180° phase shift is provided between the terminals 20 and 21 by the networks 68 and 69, and the elements 65 through 67 impedance match the parallel radiation resistances of the elements 11 and 12 at the terminal 51 such that a 50 ohm input impedance is presented at the terminal 18 for the CB transceiver 16. With the switches in this position the figure eight radiation pattern shown in FIG. 4F is produced.

With the switches 40, 50 and 60 in their fourth positions, only the radiating element 12 is excited by the CB transceiver 16, and the CB radiation pattern shown in FIG. 4B is produced. In this position the radiating element 11 is connected to the AM radio 85 and generates the pattern in FIG. 4C for the AM radio. This AM radiation pattern will not substantially interfere with the CB radiation pattern produced by the element 11 since the transceiver 16 and the AM radio 85 operate at different carrier frequencies.

With the switches 40, 50 and 60 in their second positions, the radiation pattern illustrated in FIG. 4D is produced. In this position, the radiation current present in the antenna element 11 has a positive 90° phase with respect to the radiation current in the element 12. This phase difference is provided by the presence of the inductor 71. The fact that the capacitors 72 and 73 are variable represents an important aspect of the present invention. These capacitors should be variable so that when the CB transceiver 16 is operative as a transmitter, the capacitors could have been adjusted to produce equal magnitude radiation currents in the radiating elements 11 and 12. Stating this operation in the converse fashion. When the CB transceiver is operative as a receiver, the terminal 70 should receive equal magnitude currents from the elements 11 and 12. This is important since the successful generation of a desirable cardioid radiation pattern requires that the radiating currents in the elements 11 and 12 be substantially equal. If these currents are not substantially equal, a distorted cardioid radiation pattern will be produced and this will result in a radiation pattern in which the null is not substantially directed in either the forward or reverse directions of the vehicle movement. The nonequality of the currents can also result in the radiation pattern failing to have any substantial null. The matching network 74 is provided to alter the impedance present at the terminal 70 such that a 50 ohm input impedence is present at the terminal 18.

With the switches 40, 50 and 60 in their third positions, the radiation pattern illustrated in FIG. 4E is produced in a similar manner with corresponding components functioning similarly.

Thus the network 19 in FIG. 5 illustrates a phase, magnitude and matching network which selectively simultaneously utilizes the antenna elements 11 and 12 and provides for a plurality of cardioid radiation patterns while simultaneously providing for substantially equal magnitude current coupling between the radiation currents in these antenna elements and the transceiver apparatus 16. When a 90° phase shift is produced between the radiating elements 11 and 12, one of these elements would appear to have a radiation resistance of approximately 2 ohms, while the other of these elements would have a radiation resistance of approximately 10 ohms. If the voltage supplied by the transceiver 16 were merely equally divided between the two radiating elements, as would normally be the case in prior art phase implementing networks, then the radiating current produced in the antenna elements 11 and 12 would be vastly different, and nothing resembling a cardioid radiation pattern would be produced. The present invention overcomes this problem by providing a network in which not only is an approximately 90° phase shift between radiating elements implemented, but also equal current coupling between the two radiating elements and a transceiver is also simultaneously implemented. The equal current coupling is provided by adjusting the capacitance magnitude of the variable capacitors and this insures the generation of a proper cardioid pattern. With a properly generated cardioid radiation pattern, the present invention enables a CB mobile apparatus mounted on a vehicle to selectively totally ignore all CB transmissions occuring either behind or in front of the direction of motion of the vehicle and essentially concentrate the CB transceiver sensitivity in either a forward or rear direction.

The radiation patterns shown in FIGS. 4C and 4G represent possible radiation patterns which can be produced for the transceiver 16 by a network similar to the network 19 if the switches 40, 50 and 60 are made additionally complex by having more positions. It should be realized that FIG. 4G essentially represents the radiation pattern of a dual "co-phase" antenna in which both radiating elements are fed with 0° phase difference. This antenna pattern is totally unsuitable for avoiding the pick up of unwanted CB signals which are not being transmitted directly in line between the CB transceiver and a remote site. This is because the radiation pattern is really substantially omnidirectional in its shape and has no direction in which a substantial null in the radiation pattern is created.

The operation of the logic circuit 30 will now be explained in detail. A specific implementation of this logic circuit has not been illustrated because it is believed that any person skilled in the art could construct such a circuit to perform the following functions which will now be described.

The logic circuit 30 is contemplated as receiving a low frequency oscillating signal from the oscillator 32. When the scan button 33 is depressed, this will cause a counter in the logic circuit 30 to count the signal oscillations produced by the oscillator 32. The count of this counter will sequentially supply control signals to the network 19 such that the switches 40, 50 and 60 are sequentially moved through all of their possible positions. While this is occuring, a storage circuit in the logic circuit 30 receives the AGC signal of the transceiver 16 along the line 31 for each radiation pattern generated. A holding register will hold the count of the counter that corresponds to the lowest AGC signal produced by the transceiver 16 while the antenna patterns are being sequentially scanned. This can be readily implemented by a minimum signal detector circuit controlling the loading of the counter count into the holding register. Therefore this holding register count will correspond to the position of the switches 40, 50 and 60 which resulted in the lowest AGC signal. On the next count of the counter after all of the sequential radiation patterns have been scanned, the logic circuit 30 will cause the count being stored in the holding register, which corresponds to the count that produced the lowest AGC signal, to be stored in the counter and no further counting will occur. This in essence will produce the same logic signals to the selective network 19 that originally produced the lowest AGC signal on the line 31. In this manner, the logic circuit 30 and the selective network 19 automatically select one of the radiation patterns as an optimum radiation pattern wherein this optimum radiation pattern corresponds to the radiation pattern in which a desired signal is most strongly received by the transceiver means. This is because the lowest AGC signal will be produced in response to the strongest signal being received by the transceiver.

If the logic circuit 30 is designed such that it only sequentially steps between the two cardioid directive radiation patterns, then this automatic radiation pattern selecting apparatus will result in selecting the directive radiation pattern which is more nearly directed towards the remote site which the CB transceiver desires to communicate with.

The indicator 35 merely represents a visual indication of which one of the radiation patterns is being generated by the radiating antenna elements 11 and 12. Thus for the network 19 shown in FIG. 5, four indicating lights would be provided, each one separately corresponding to the generation of one of the radiation patterns 4B, 4D, 4E, or 4F.

If the logic circuit 30 scans only through the radiation patterns 4D and 4E, it will select only the radiation pattern which provides the strongest received signal to the CB transceiver 16. This selected radiation pattern will then be indicated by the indicator 35 and this will indicate whether the remote site which the CB transceiver desired to communicate with is located in front of or behind the motor vehicle 10. This information can often times be extremely valuable to the operator of the mobile CB transceiver. Many times transmissions are received which merely inform the listener that an accident has occured somewhere on the highway. Without knowing whether the transmission originated in front of or behind the vehicle 10, it would be impossible for the driver of motor vehicle 10 to know whether he should turn off the highway because of the possibility of traffic congestion developing ahead due to the accident.

The manual step switch 34 merely represents a switch which will cause the logic circuit 30 to sequentially step the selective network 19 through each of the possible radiation patterns in response to each manual depression of the step switch 34. This of course can merely be implemented by having the manual step switch 34 increment a counter whose count controls the position of the switches 40, 50 and 60. In this manner, the communication apparatus 15 will not only provide an automatic indication of which radiation pattern produces the strongest received signal by use of the scanning switch 33, but will also enable the operator of the transceiver 16 to avoid interferring signals by selecting a radiation pattern which may be weaker in the direction of the remote site but has a null advantageously positioned for minimizing the effect of interferring signals which are not directly in line between the transceiver and the remote communication site which the transceiver desires to communicate with. In addition, the AGC signal strength meter 38, visually indicates the magnitudes of the received signal. This in conjunction with the manual step switch and indicating lights would enable the transceiver operator to manually determine the location of a remote transmitting site by comparing the AGC signal strengths for each directive radiation pattern generated.

It should also be pointed out that in the fourth position of the switches 40, 50 and 60, the terminal 54 is connected to a seperate AM radio broadcast receiver 85. This provides for having the transceiver 16 connected to the radiating element 12 and producing a generally omnidirectional radiation pattern such as that shown in FIG. 4B, while a separate AM radio apparatus is coupled to the radiating element 11. In some applications it is desirable to simultaneously monitor both the AM broadcast band as well as the CB band. The present invention therefore, conveniently provides two radiating antenna elements which can independently perform this function, while providing for utilizing both of the antenna elements in the CB frequency band to produce directive CB radiation patterns whenever CB transmission or reception is solely desired.

While we have shown and described specific embodiments of this invention, further modifications and improvements will occur to those skilled in the art. All such modifications which retain to basic underlying principles disclosed and claimed herein are with the scope of this invention.

We claim:
1. A directive antenna system comprising:
a motor vehicle movable in a straight line direction;

first transceiver communication means carried by said motor vehicle and operative at a first frequency for establishing communications with a site remotely located from said first communication means;

second communication means carried by said vehicle and operative at a second frequency for establishing communications with other remote sites;

a plurality of at least two antenna elements mounted to said vehicle and selectively coupled to said first and second communication means for providing radiation patterns for said first and second communication means;

said two antenna elements positioned on said motor vehicle at approximately one quarter of a wavelength apart at the operating frequency of said first transceiver communication means, said two antenna elements mounted along a line substantially parallel to the straight line direction of movement of the motor vehicle;

means including a network coupled to said antenna elements for selectively generating and maintaining any one of a plurality of at least two discrete directive radiation patterns for said first transceiver communication means by simultaneously utilizing said two antenna elements while selectively providing various phase differences between said utilized antenna elements and simultaneously providing for substantially equal magnitude current coupling between said utilized antenna elements and said first communication means, said network also selectively utilizing each one of said two antenna elements to simultaneously generate a separate radiation pattern for each of said first and second communication means, respectively, said plurality of directive radiation patterns for said first communication means including at least two radiation patterns which have substantial nulls directed in substantially different directions;

first means for indicating which one of said plurality of directive radiation patterns is selectively generated for said first communication means; and second means for indicating the magnitude of a desired signal transmitted at said remote site and received by said first communication means in the selected directive radiation pattern; and means coupled to said network for automatically selecting one of said directive radiation patterns as an optimum pattern for said first communication means, said automatically selected optimum radiation pattern corresponding to the one pattern of said plurality of directive patterns in which a desired signal is most strongly received by said first communication means.

2. A directive antenna system comprising:

communication means operative at a carrier frequency for establishing communications with a remote site;

means coupled to said communication means for selectively generating a plurality of discrete directive radiation patterns for said communication means; and means coupled to said radiation pattern generating means for automatically selecting one of said radiation patterns as an optimum pattern for said communication means, said automatically selected optimum radiation pattern corresponding to the one pattern of said plurality of patterns in which a desired signal is most strongly received by said communication means;

whereby the communication means is automatically able to avoid interferring signals which are not directly in line between the communication means and the remote site;

said directive antenna system including indicating means coupled to said radiation pattern generating means for indicating which one of said plurality of directive radiation patterns is selectively generated for said communication means, whereby said indicating means, in conjunction with said pattern selecting means, generally provides information as to the location of the remote site with respect to the location of said communication means.

3. A directive antenna system according to claim 2 wherein said communication means comprises transceiver apparatus.

4. A directive antenna system according to claim 2 wherein said automatic selecting means includes circuitry for monitoring an AGC signal of a receiver portion of said communication means in order to determine the pattern which produces the strongest desired received signal.

5. A directive antenna system according to claim 4 wherein said automatic selecting means includes circuitry for sequentially stepping said radiation pattern generating means through said plurality of radiation patterns while monitoring said AGC signal in order to determine the optimum radiation pattern for receiving said desired signal.

6. A directive antenna system according to claim 5 which includes means, in addition to said automatic selecting means, for manually selecting any one of said plurality of radiation patterns.

7. A directive antenna system according to claim 5 wherein said radiation pattern generating means includes a plurality of antenna elements mounted on a motor vehicle.

8. A directive antenna system according to claim 7 wherein said plurality of antenna elements comprise a first and a second antenna element spaced approximately one quarter of a wavelength apart at the operative carrier frequency of said communication means.

9. A directive antenna system according to claim 8 wehrein said radiation pattern generating means includes circuitry for providing a positive and negative predetermined phase difference between said first and second antenna elements to create two oppositely directed generally cardioid shaped radiation patterns for said communication means.

10. A directive antenna system according to claim 2 wherein said indicating means comprises a series of lights with at least one individual light corresponding to each of said plurality of radiation patterns.

11. A directive antenna system according to claim 2 wherein said communication means comprises a radio transceiver having a housing, and said indicating means are located in a container attached to said housing.

12. A directive antenna system according to claim 11 wherein said automatic selecting means is also substantially located in said container.

13. A directive antenna system according to claim 12 wherein an electrical connection exists between said transceiver means and said automatic selecting means through which a AGC signal of the transceiver means is monitored by said automatic selecting means.

14. A directive antenna system comprising:

communication means operative at a frequency for establishing communications with a site remotely located from said communication means;

a plurality of antenna elements coupled to said communication means for providing radiation patterns for said communication means; and means coupled to said antenna elements for selectively generating a plurality of discrete directive radiation patterns for said communication means by simultaneously utilizing at least two of said antenna elements at any one time, said selective radiation pattern generating means including a network coupling said plurality of antenna elements to said communication means and selectively providing various phase differences between said utilized antenna elements while simultaneously providing for substantially equal magnitude current coupling between said utilized antenna elements and said communication means, whereby substantially identical but differently directed radiation patterns can be created by the use of various phase differences in conjunction with controlling of the magnitude coupling of the radiation currents between the antenna elements and the communication means.

15. A directive antenna system according to claim 14 wherein said plurality of radiation patterns includes at least two radiation patterns directed in substantially opposite directions.

16. A directive antenna system according to claim 15 wherein said network provides positive and negative predetermined phase differences between two of said utilized antenna elements to create said two oppositely directed radiation patterns for said communication device.

17. A directive antenna system according to claim 16 wherein said utilized antenna elements consist of two elements approximately one quarter of a wavelength apart at the operating frequency of said communication means, and wherein said oppositely directed radiation patterns are generally cardioid shaped, and wherein said network provides a positive and negative difference of approximately 90° between said two utilized antenna elements to produce said oppositely directed cardioid radiation patterns.

18. A directive antenna system according to claim 16 wherein for generating one of said oppositely directed radiation pattern said network provides a variable capacitor coupled between said communication means and one of said utilized antenna elements and a variable capacitor in series with an inductor between said communication means and the other of said utilized antenna elements, and wherein said network provides substantially the opposite type of connection between said utilized antenna elements and said communication means for generating the other of said oppositely directed radiation pattern.

19. A directive antenna system according to claim 18 wherein said network provides a first impedance matching network for matching said utilized antenna elements to said communication means while generating said one of said one of said oppositely directed radiation patterns, and wherein said network provides a second impedance matching network between said two utilized elements and said communication means while generating the other of said oppositely directed radiation patterns.

20. A directive antenna system according to claim 18 wherein said utilized antenna elements consist of two elements approximately one quarter of a wavelength apart at the operating frequency of said communication means, and wherein said oppositely directed radiation patterns are generally cardioid shaped.

21. A directive antenna system according to claim 20 wherein said network provides a positive and negative difference of approximately 90° between said two utilized antenna elements to produce said oppositely directed cardioid radiation patterns.

22. A directive antenna system according to claim 21 wherein said approximately 90° phase difference is substantially 70°.

23. A directive antenna system according to claim 20 wherein said radiation pattern generating means also includes structure for utilizing said two antenna elements to produce a figure eight radiation pattern.

24. A directive antenna system according to claim 20 wherein said two antenna elements are mounted on a motor vehicle and are mounted in a line parallel to the direction of motion of said motor vehicle.

25. A directive antenna system comprising:

transceiver means operable at a carrier frequency and adaptable to be carried by a motor vehicle for establishing two-way communications between the motor vehicle and a remote site;

at least two antenna elements adapted to be carried by said motor vehicle for establishing radiation patterns for said transceiver means;

means coupled to said antenna elements for selectively generating and maintaining any one of a plurality of discrete directive radiation patterns for said transceiver means by simultaneously utilizing said two antenna elements, said plurality of radiation patterns including at least two radiation patterns which have substantial nulls directed in substantially opposite directions;

said two utilized antenna elements adapted to be positioned on said motor vehicle at approximately one quarter of a wavelength apart at the operating frequency of said transceiver means, said two antenna elements adapted to be mounted along a line substantially parallel to the straight line of movement of the motor vehicle.

26. A directive antenna system according to claim 25 wherein said radiation pattern generating means produces a first cardioid radiation pattern directed in the forward direction of motion of said motor vehicle with a substantial null in the rearward direction and a second cardioid radiation pattern directed in the rearward direction of motion of said motor vehicle with a substantial null in the forward direction.

27. A directive antenna system according to claim 26 wherein said radiation pattern generating means also produces a figure eight radiation pattern having one lobe directed in the forward direction of motion of said motor vehicle and the other lobe directed in the rearward direction of motion of said motor vehicle.

28. A directive antenna system according to claim 26 which includes indicating means coupled to said transceiver means for indicating which of said cardioid radiation patterns is selectively generated for said transceiver means, whereby said indicating means provides information as to the location of the remote site with respect to the location of said transceiver means.

29. A directive antenna system according to claim 28 which includes means coupled to said radiation pattern generating means for automatically selecting one of said cardioid radiation patterns as an optimum radiation pattern, said automatically selected optimum radiation pattern corresponding to the cardioid pattern in which a desired signal is most strongly received by said transceiver means.

30. A directive antenna system according to claim 29 wherein said selective radiation pattern generating means includes a network coupling said antenna elements to said communication means and selectively providing various phase differences between said utilized antenna elements while simultaneously providing for substantially equal magnitude current coupling between said utlized antenna elements and said communication means, whereby substantially identical but differently directed radiation patterns can be created by the use of various phase differences in conjunction with controlling of the coupling of the radiation currents between the antenna elements and the communication means.

31. A directive antenna system according to claim 25 wherein said selective radiation pattern generating means includes a network coupling said antenna elements to said communication means and selectively providing various phase differences between said utilized antenna elements while simultaneously providing for substantially equal magnitude current coupling between said utilized antenna elements and said communication means, whereby substantially identical but differently directed radiation patterns can be created by the use of various phase differences in conjunction with controlling the coupling of the radiation currents between the antenna elements and the communication means.

32. A directive antenna system comprising:
a motor vehicle movable in a straight line direction;
transceiver means operable at a carrier frequency and carried by said motor vehicle for establishing two-way communications between the motor vehicle and a remote site;
at least two antenna elements mounted to said motor vehicle for establishing radiation patterns for said transceiver means;
means coupled to said antenna elements for selectively generating and maintaining any one of a plurality of discrete directive radiation patterns for said transceiver means by simultaneously utilizing said two antenna elements, said plurality of radiation patterns including at least two radiation patterns which have substantial nulls directed in substantially different directions;
said two utilized antenna elements positioned on said motor vehicle at approximately one quarter of a wavelength apart at the operating frequency of said transceiver means, said two antenna elements mounted along a line substantially parallel to the straight line direction of movement of the motor vehicle.

33. A directive antenna system according to claim 32 wherein said radiation pattern generating means produces a first cardioid radiation pattern directed in the forward direction of motion of said motor vehicle with a substantial null in the rearward direction and a second cardioid radiation pattern directed in the rearward direction of motion of said motor vehicle with a substantial null in the forward direction.

34. A directive antenna system according to claim 33 which includes indicating means coupled to said transceiver means for indicating which of said cardioid radiation patterns is selectively generated for said transceiver means, whereby said indicating means provides information as to the location of the remote site with respect to the location of said vehicle and transceiver means.

35. A directive antenna system according to claim 34 which includes means coupled to said radiation pattern generating means for automatically selecting one of said cardioid radiation patterns as an optimum radiation pattern, said automatically selected optimum radiation pattern corresponding to the cardioid pattern in which a desired signal is most strongly received by said transceiver means.

36. A directive antenna system according to claim 32 wherein said selective radiation pattern generating means includes a network coupling said antenna elements to said communication means and selectively providing various phase differences between said utilized antenna elements while simultaneously providing for substantially equal magnitude current coupling between said utilized antenna elements and said communication means, whereby substantially identical but differently directed radiation patterns can be created by the use of various phase differences in conjunction with controlling of the coupling of the radiation currents between the antenna elements and the communication means.

37. A directive antenna system comprising:
first communication means operative at a first frequency for establishing communications with a site remotely located from said communication means;
second communication means operative at a second frequency for establishing communications with other remote sites;
a plurality of antenna elements selectively coupled to said first and second communication means for providing radiation patterns for said first and second communication means; and
means coupled to said antenna elements for selectively generating at least one discrete directive radiation pattern for said first communication means by simultaneously utilizing at least two of said antenna elements at one time, and also for selectively separately utilizing each one of said two antenna elements to simultaneously generate a separate radiation pattern for each of said first and second communication means respectively.

38. A directive antenna system according to claim 37 wherein said plurality of antenna elements consists of a first and a second antenna element.

39. A directive antenna system according to claim 38 wherein said separate radiation patterns are created by said selective pattern generating means independently coupling said first communication means to said first antenna element and said second communication means to said second element.

40. A directive antenna system according to claim 39 wherein said separate radiation patterns are substantially omnidirectional.

41. A directive antenna system according to claim 39 wherein said selective pattern generating means creates said one directive radiation pattern by coupling said first communication means to both said first and second antenna elements.

42. A directive antenna system according to claim 41 wherein said second communication means is isolated from said antenna elements during the creation of said one directive radiation pattern for said first communication means.

43. A directive antenna system according to claim 42 wherein said first communication means is a CB transceiver and said second communication means includes a receiver.

44. A directive antenna system according to claim 37 wherein said plurality antenna elements comprise two antenna elements that are mounted to a motor vehicle which is movable in a straight line, said two antenna elements mounted along a line substantially parallel to the straight line direction of movement of the motor vehicle.

45. A directive antenna system according to claim 37 wherein said coupling means generates at least two directive radiation patterns for said first communication means.

46. A directive antenna system according to claim 45 wherein said coupling means includes means for automatically selecting one of said directive radiation patterns as an optimum pattern for said first communication means, said automatically selected optimum radiation pattern corresponding to the one pattern of said plurality of patterns in which a desired signal is most strongly received by said first communication means.

47. A directive antenna system according to claim 45 wherein said coupling means includes a network coupling said plurality of antenna elements to said first communication means and selectively producing said directive radiation patterns by providing various phase differences between two of said antenna elements while simultaneously providing for substantially equal magnitude current coupling between said two antenna elements and said first communication means, whereby substantially identical but differently directed radiation patterns can be created by the use of various phase differences in conjunction with controlling of the magnitude coupling of the radiation currents between the antenna elements and the first communication means.

48. A directive antenna system comprising:
communication means operative at a carrier frequency for establishing communications with a remote site;
means coupled to said communication means for selectively generating and maintaining any one of a plurality of discrete directive radiation patterns for said communication means;
first means for indicating which one of said plurality of directive radiation patterns is selectively generated for said communication means; and
second means for visually indicating the magnitude of a desired signal transmitted at said remote site and received by said communication means for the selected directive radiation pattern;
whereby said first and second means provide information as to the location of the remote site with respect to said communication means.

49. A directive antenna system according to claim 48 wherein said selective radiation pattern generating means includes a manual actuator for selecting any of said plurality of radiation patterns.

* * * * *